Figure 7:
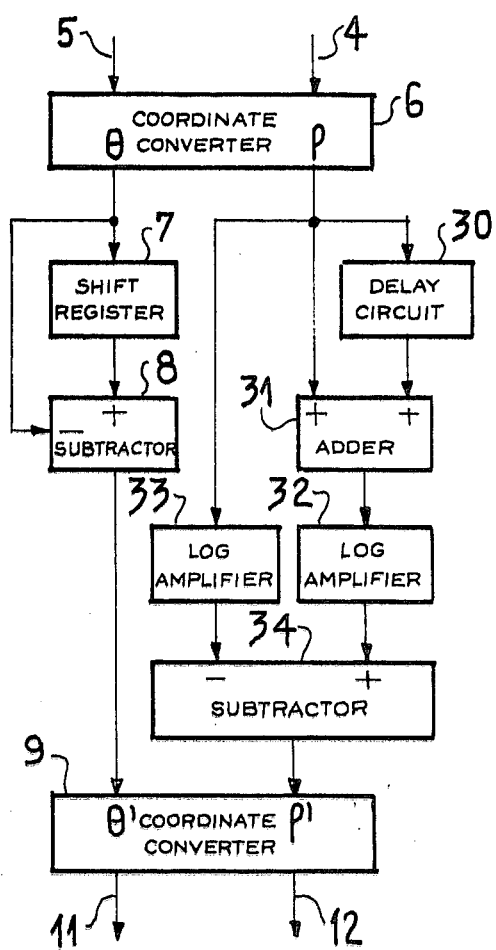

United States Patent [19]

Sirven

[11] 4,110,753

[45] Aug. 29, 1978

[54] DEVICE FOR PROCESSING SIGNALS FROM A COHERENT PULSE RADAR

[75] Inventor: Jacques Sirven, Paris, France

[73] Assignee: Thomson-CSF, Paris, France

[21] Appl. No.: 764,518

[22] Filed: Jan. 31, 1977

[30] Foreign Application Priority Data

Feb. 3, 1976 [FR] France .................... 76.02938

[51] Int. Cl.² ............................... G01S 9/44
[52] U.S. Cl. ................................... 343/8
[58] Field of Search ..................... 343/55 C, 8

[56] References Cited

U.S. PATENT DOCUMENTS 3,099,794  7/1963  Essam et al. ................ 343/8 X
3,869,601  3/1975  Metcalf ..................... 343/5 DP X Primary Examiner—Malcolm F. Hubler
Attorney, Agent, or Firm—Karl F. Ross

[57] ABSTRACT

A device for processing radar signals which enable precise Doppler information to be obtained. The signals, demodulated in cartesian coordinate X and Y and then coded are converted into polar coordinate $\rho$ and $\theta$. Then $\theta$ is replaced by the difference $\theta'$ between two successive values of $\theta$ received during two consecutive repetitions. The couple $\rho$, $\theta'$ is converted into cartesian coordinate X' and Y', filtered and then reconverted into polar coordinate $\rho''$ and $\theta''$ where $\rho''$ represents the amplitude relative to the echo and $\theta''$ its Doppler speed.

7 Claims, 7 Drawing Figures

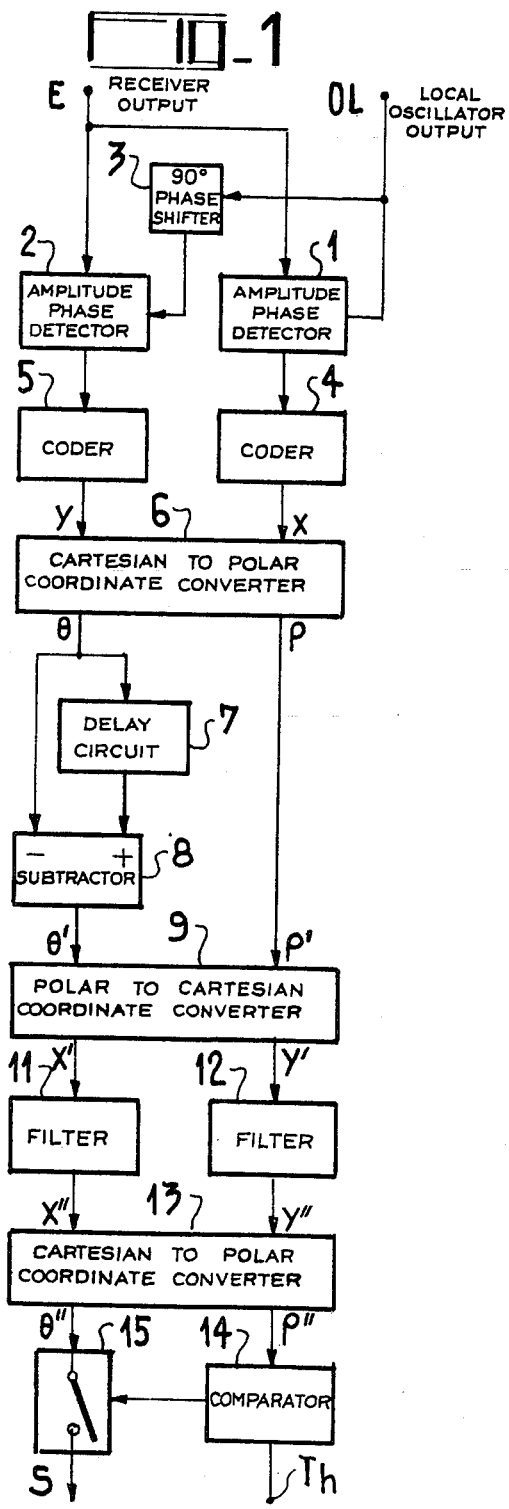
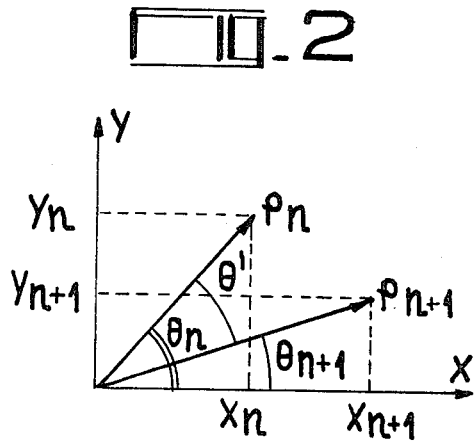
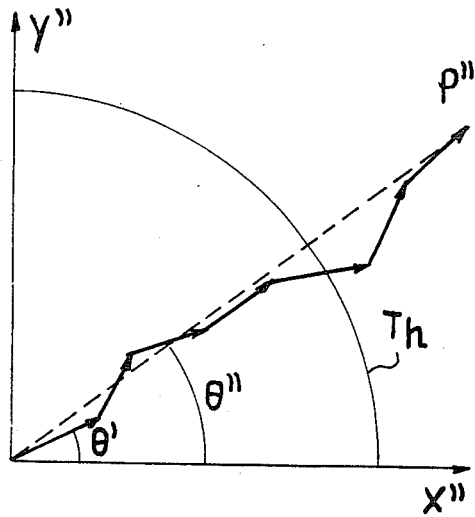

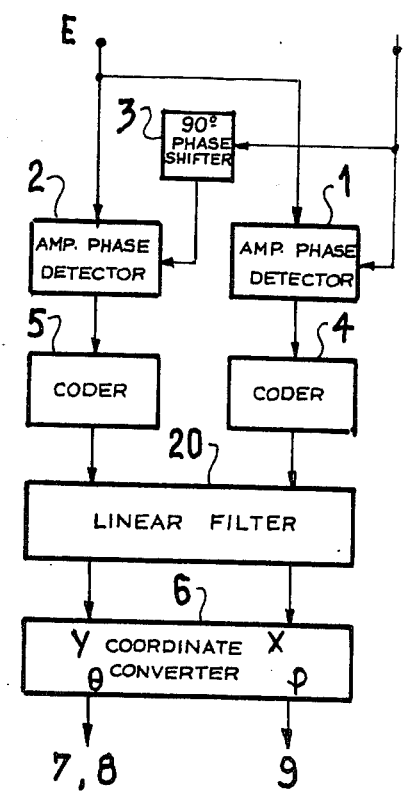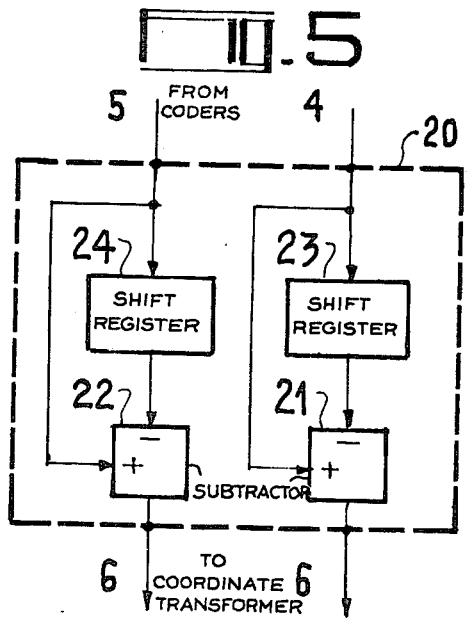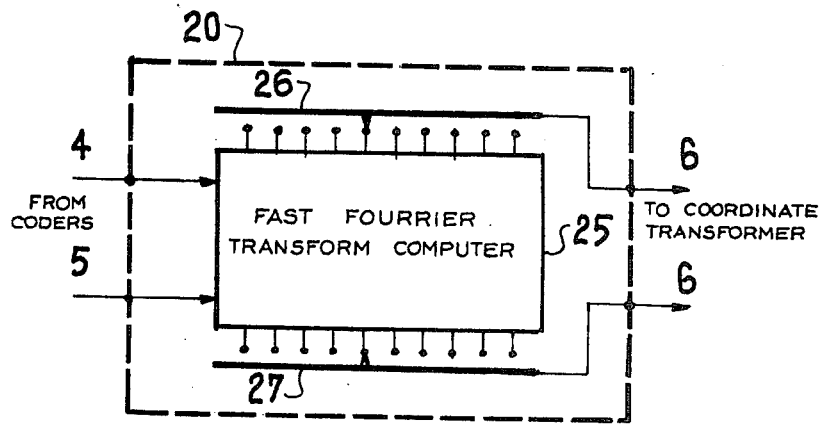

DEVICE FOR PROCESSING SIGNALS FROM A COHERENT PULSE RADAR

The invention covers devices for processing signals received by a coherent pulse radar.

It is known that in pulse radars, during each repetition period, the reception period is divided into equal parts called range sections. A target in space produces an echo in a range section and this echo is repeated during a number of repetition periods which are a function of the antenna sweep speed and the aperture of its diagram. As the useful echoes are mixed with noise, it is necessary to filter correctly the signals during all the repetition periods containing an echo of the target.

The ideal filter producing the highest probability of detection for a given signal to noise ratio is the matched linear filter. However, it requires the use of a battery of filters for each range section because the signals received may have a Doppler frequency differing from one target to another; this is necessarily the case for an airborne radar. Hence the linear filter is heavy and voluminous.

Classical filtering by post-integration has the advantage of not requiring a large number of filters and is easier to use but it does not give such a high detection probability as linear filtering.

In practise, for a given detection probability, linear filtering will require a signal to noise ratio greater than 1 to 1.5 dB above the value corresponding to the ideal filter in particular because the central frequently of the filters differs slightly from that of the echo while filtering by post-integration requires a signal to noise ratio very much higher.

One purpose of the present invention is to offer a device for signal processing which is less bulky than a linear filtering device and enables a higher detection probability to be obtained than with a post-integration filtering device.

One object of the invention is a signal processing device which is easier to use than linear filtering.

In accordance with the invention, each echo received is demodulated at the intermediate frequency coherently in two amplitude-phase detectors, which are fed in quadrature by the same local oscillator. The detectors' output signals are then coded and converted into two signals $\rho_n$ and $\theta_n$ which represent the modulus and argument respectively of a vector. Memory and subtraction means which receive the successive $\theta_n$ signals then deliver signals $\theta'_n = \theta_n - \theta_n - 1$. The signal couples ($\rho_n$, $\theta'_n$) are then applied to filtering equipment to obtain the vectorial sum, over a given number of repetitions, of the vectors whose module is $\rho_n$ and whose argument is $\theta_n$. The signal $\theta''$ which is obtained represents the Doppler frequency of the target detected and the signal $\rho''$ which is obtained represents the amplitude of the target echo.

Several advantages result from the simultaneous presence at the output of information about the target's Doppler frequency on the one hand and the echo amplitude on the other.

The amplitude signal, after comparison with a threshold, enables an indication of target presence to be obtained to validate the information about the Doppler speed.

This presence indication, if the amplitude information is standardized, enables a constant false alarm to be obtained.

Other advantages will appear in the description which follows and is illustrated by the figures which show:

in FIG. 1, a theoretical schematic of a processing device in accordance with the invention, in FIGS. 2 and 3, an illustration of the operation of the processing device, in FIG. 4, a processing device combined with linear filtering circuits, in FIGS. 5 and 6, examples of filters, in FIG. 7, an improvement of the device in accordance with the invention.

FIG. 1 shows the signal processing device complying with the invention.

This device is fitted at the output of a radar receiver supplying received signals at the intermediate frequency and range section synchronizing signals.

The intermediate frequency signals are applied to an input E which is coupled to the inputs of two amplitude-phase detectors 1 and 2 that are intended to demodulate the signals received. The detectors receive a demodulation reference signal supplied by the receiver's local oscillator. This reference signal, when supplied to terminal OL, is applied directly to detector 1 and through a 90° dephasing unit to detector 2.

The detectors then deliver two signals in quadrature which represent each echo in the complex plane. These two signals are assimilated to the X and Y coordinates of a vector which may then be defined by its modulus $\rho$ and argument $\theta$.

The X and Y signals are then applied to analog-digital coding circuits 4 and 5 and then to circuit 6 which converts the X and Y coordinates into $\rho$ and $\theta$ coordinates.

Only the $\theta$ coordinate is processed and this gives $\theta'_n = (\theta_n - \theta_{n-1})$ with modulus [$2\pi$], $\theta_n$ and $\theta_{n-1}$ being the values of $\theta$ obtained on two consecutive recurrences for a given range section. The coordinate $\theta$ is then applied to delay circuit 7 and a subtractor circuit 8 is connected to the input and output of the delay circuit and delivers $\theta'$.

Delay circuit 7 is formed by a shift register the number of whose stages is equal to the number of range sections per repetition. It can thus contain all the values of $\theta$ of these range sections and apply the same delay to them thanks to an instruction for an adequate shift supplied by the radar's general synchronizing circuits. These instruction circuits are not shown because they would overload the figure unnecessarily on the one hand and are well known to professionals on the other.

The $\theta'$ and $\rho$ data are then applied to inverse converter 9 which delivers the X' and Y' coordinates. These coordinates are filtered and integrated or added in circuits 11 and 12. The resulting new values X" and Y" are again converted into their homologues $\rho''$ and $\theta''$ in converter 13.

Coordinate $\rho''$ is compared with a threshold Th in comparator 14. The comparator output controls the closing of switch 15 which delivers, at an output S, the signal $\theta''$ when $\rho$ exceeds the threshold Th.

FIGS. 2 and 3 explain the operation of the processing device.

An echo received in a range section during several repetitions (7 for example in FIG. 3) is considered. The echo signal is characterized at each repetition by a modulus $\rho$ and an argument $\theta$. The argument $\theta$ may be anything if only one recurrence is considered. However, by considering a large number of repetitions, the signal $\theta$ enables the target's Doppler speed to be known.

For a fixed target, the signal $\theta$ is constant in the absence of noise. In the presence of noise, from one repetition to the next $\theta$ is not constant but on the average over several repetitions $\theta$ remains constant. By computing the difference $\theta_{n+1} - \theta_n$, the mean of these differences over several repetitions is roughly equal to zero.

For a moving target, $\theta$ varies by a quantity $\theta'$ from one repetition to the next, $\theta'$ being proportional to the Doppler speed of the target considered. The mean of the difference $\theta'$ over several repetitions remains constant and the mean $\theta''$ is proportional to the target's Doppler speed.

However, the modulus $\rho$, which is also affected by noise, must be taken into account too. That is why the processing device produces the vectorial sum of the vectors of modulus $\rho_n$ and arguments $\theta'_n = \theta_n - \theta_{n-1}$ in filters 11 and 12.

This operation has two advantages: On the one hand it enables the mean to be obtained of the $\theta'_n$ weighted by the moduli $\rho_n$ and give precise information on the target's Doppler speed. On the other it enables information about the amplitude of the echo $\rho''$ to be obtained, which, when compared with a threshold Th, shows the presence or absence of a target.

FIG. 2 shows the echoes received during two consecutive repetitions in the same range section. The first echo is represented by a vector with the coordinates $X_n$ and $Y_n$ which are converted in 6 to $\rho_n$ and $\theta_n$. The next echo is represented by a second vector with coordinates $X_{n+1}, Y_{n+1}, \rho_{n+1}$ and $\theta_{n+1}$. Circuits 7 and 8 then determine the difference $\theta'_{n+1} = \theta_{n+1} - \theta_n$. The vectorial sum of the vectors with modulus $\rho_{n+1}$ and $\theta_{n+1}$ is obtained by filters 11 and 12 after conversion to the coordinates $X'_{n+1}$ and $Y'_{n+1}$. These filters are formed by simple integrators of digital technology. The moduli $\rho''$ and arguments $\theta''$ of the vectorial sum shown on FIG. 3 are obtained at the output of converter 13.

The threshold Th is shown on FIG. 3 as an arc of a circle. For a signal to appear at the output of the device, the vector sum representing the echo being considered must be outside the portion of the circle limited by the arc Th.

Production of a processing device in accordance with the invention is within the capacity of a professional. Amplitude-phase detector circuits are present in almost all radars. Analog-digital coders exist on the market and are very fast. Circuits for converting polar coordinates to cartesian and vice-versa are known to professionals. For example, the conversion of X and Y to $\rho$ and $\theta$ brings into play a circuit for computing the modulus $\rho = \sqrt{X^2 = Y^2}$ and the argument $\theta$ is obtained at the output of a direct access memory containing Sine and Cosine values to whose input is applied the value $X/\rho$ or $Y/\rho$. In the same way, the inverse conversion is obtained from computing circuits which perform the operations $X = \rho\cos\theta$ and $Y = \rho\sin\theta$. Filters 11 and 12 are digital filters which contain, for example, an adder circuit in series with a shift register. The number of sections in the register is equal to the number of range sections and each signal for a given range section transits in the register for a time equal to the reception period. The adder input receives simultaneously each new item of information and that of the preceding repetition, which has been much attenuated, from the register output. When the processing device is applied to an acquisition radar, filters 11 and 12 may be more complicated so that their pulse response may be as close as possible to the modulation of the antenna lobe.

FIG. 4 shows a processing device operating in conjunction with linear filtering circuits. Linear filter 20 is fitted between the outputs of coders 4 and 5 and the inputs of converter 6. This filter completes the action of the processing device.

A first example of a filter, 20, is shown in FIG. 5. This filter consists of two identical channels, each containing a subtractor circuit (21, 22) in series with a shift register (23, 24) acting as a delay circuit. The register output is connected to the subtractor's subtracting input while the register input is connected to the adding input. The delay introduced by each register is equal to the the radar's repetition period. The number of sections in the registers is equal to the number of range sections in each repetition. The register shift control operates in synchronism with that of the range sections in the rest of the radar. Hence, if $X_n$ and $Y_n$ are the signals delivered by coders 4 and 5 on a given recurrence, then on the next recurrence circuits 21 and 23 in filter 20 deliver $X_n - X_{n-1}$ while circuits 22 and 24 deliver $Y_n - Y_{n-1}$. This type of filter enables fixed echoes to be eliminated, such as ground echoes in a fixed radar installation.

An attenuator may later be added in each channel between the register output and the corresponding subtractor input to obtain a particular filter response.

Another type of filter 20 is shown on FIG. 6. It is a traditional set of filters 25 or a circuit for computing the fast Fourier transform of the input signals. In this type of filter, $2q$ outputs correspond to the two inputs X and Y, $q$ being the number of adjacent filters it contains. The signals applied to coordinate converter 6 are picked up at the outputs of filter 25 by means of two synchronized, $q$ position switches, which are preferably controlled in synchronism with the range sections. For example, a set of 100 adjacent filters to which are applied input signals with a 20 kHz pass band deliver $2 \times 100$ signals with a 200 Hz pass band. The processing device in accordance with the invention enables the number of filters, which would have to have been used to go from 20 kHz to 20 Hz (i.e. 1000 filters), to be divided by 10.

FIG. 7 shows an improvement of the device in accordance with the invention which enables a constant false alarm rate to be obtained, the latter being determined by the threshold Th. It consists in standardizing the value of modulus $\rho$ between the output of converter 6 and the corresponding input of converter 9. On this figure the circuits which precede converter 6 or follow converter 9 have not been shown as they were already on FIG. 1.

The standardizing of modulus $\rho$ is obtained by analysis of the contents of two non-consecutive range sections $\rho_1$ and $\rho_2$ and performing the operation $\rho' = \log(\rho_1 + \rho_2/\rho_1)$.

Delay circuit 30, which introduces a delay equal to the length of 2 or 3 range sections is therefore connected to the output $\rho$ of converter 6. The input and output of this delay circuit are connected to adder 31. A logarithmic amplifier 32, which receives the output signals from adder 31, delivers $\log(\rho_1 + \rho_2)$.

Another logarithmic amplifier 33 connected directly to the converter output delivers $\log(\rho_1)$. Subtractor 34, which is connected to the outputs of the logarithmic amplifiers, then delivers the standardized modulus $\rho'$ to the corresponding input of converter 9. As a reminder the channel followed by the arguments $\theta$ is shown; this includes, as in FIG. 1, shift register 7 and subtractor 8 in series with the register.

The invention applies to radar systems and also to sonar pulse systems.

Of course the invention is not limited to the embodiment described and shown which was given solely by way of example.

What is claimed is:

1. A device for processing signals received by a coherent pulse radar, said device containing two amplitude-phase detectors for demodulating in quadrature said radar signals and for delivering respective video signals (X, Y), means for coding the said (X, Y) video signals, first means for converting (X, Y) coded signals representing cartesian coordinates into ($\rho$, $\theta$) signals representing respectively the polar coordinates corresponding to the cartesian coordinates (X, Y), means for delaying and subtracting the signals ($\theta$) received from at least two consecutive repetition periods, delivering a signal ($\theta'$), second means for converting ($\rho$, $\theta'$) signals into (X', Y') signals representing the corresponding cartesian coordinates, means for filtering the said (X', Y') signals and third means for converting the filtered (X'', Y'') signals into ($\rho''$, $\theta''$) signals which are the corresponding polar coordinates, for delivering the signal $\rho''$ representing the amplitude of the echoes received by the radar and the signal $\theta''$ representing the Doppler speed of the said echoes.

2. A processing device as in claim 1, further comprising a threshold detector circuit for receiving the ($\rho''$) signals from the third conversion means and a gate for receiving the ($\theta''$) signals which is controlled by threshold detector (14).

3. A processing device as in claim 1, further comprising a linear filter circuit fitted between the coding means and the first conversion means.

4. A device as in claim 3, wherein the linear filter circuit contains two identical channels for identical filtering of the coded (X, Y) signals, each of the said channels containing a subtractor circuit receiving one of the coded signals, on the one hand directly and on the other through a delay circuit.

5. A device as in claim 3, wherein that the filter circuit contains a set of filters and switching means for picking up in succession pairs of output signals from the filters.

6. A device as in claim 2, further comprising means for standardizing modulus $\rho$ fitted between the first and second conversion means for giving a constant false alarm rate at the output of said gate.

7. A device as in claim 6, wherein the standardizing means comprise a subtractor circuit for delivering the standardized modulus ($\rho'$) whose inputs are connected to the outputs of two logarithmic amplifiers, one of which receives a signal ($\rho_1$) from the first conversion means while the other receives the sum of the same signal ($\rho_1$) and a signal ($\rho_2$) delivered by the conversion means after passing through a delay circuit.

* * * * *